United States Patent
Tompkins

[19]

[11] Patent Number: 6,040,762
[45] Date of Patent: Mar. 21, 2000

[54] MAGNETIC SWITCH FOR AUTOMOTIVE SECURITY SYSTEM

[76] Inventor: Eugene Tompkins, 16016 E. Warren, Detroit, Mich. 48224

[21] Appl. No.: 09/085,506

[22] Filed: May 27, 1998

Related U.S. Application Data

[60] Provisional application No. 60/076,308, Feb. 27, 1998, and provisional application No. 60/047,726, May 27, 1997.

[51] Int. Cl.$^7$ ..................................................... B60R 25/10
[52] U.S. Cl. .................. 340/426; 340/825.31; 307/10.2; 335/1; 335/207
[58] Field of Search ............................... 340/426, 825.31, 340/547; 307/10.2; 335/1, 205, 207, 219

[56] References Cited

U.S. PATENT DOCUMENTS

| | | | |
|---|---|---|---|
| 4,311,981 | 1/1982 | Luzynski | 335/207 |
| 4,323,878 | 4/1982 | Luzynski | 340/430 |
| 4,575,706 | 3/1986 | Heidman, Jr. | 340/430 |
| 4,983,947 | 1/1991 | Mullen et al. | 340/426 |
| 5,764,144 | 6/1998 | Falkiner et al. | 340/426 |

*Primary Examiner*—Daniel J. Wu
*Attorney, Agent, or Firm*—John R. Benefiel

[57] ABSTRACT

A switching arrangement for a security circuit as for an automobile, in which an arming switch is mounted behind a covering structure at a concealed location. A switch is normally attached to a position covering spaced conductors turning on the security circuit. A latching magnet is positioned over the concealed locations to pull the switching magnet off the conductors and disarm the security circuit.

5 Claims, 3 Drawing Sheets

MAGNETIC SWITCH FOR AUTOMOTIVE SECURITY SYSTEM

CROSS REFERENCE TO RELATED APPLICATIONS

This application claims the benefit of provisional application 60/076,308 filed on Feb. 27, 1998 and 60/047,726 filed on May 27, 1997.

BACKGROUND OF THE INVENTION

This invention concerns security systems, such as for protecting automobiles from unauthorized use, such as described in U.S. Pat. Nos. 5,600,299 and 5,432,495.

In such systems there is a need to allow arming of the system when the operator leaves the auto (or the dwelling). The arming switch must be well concealed since a would-be thief could simply operate the switch to disarm the system.

It is the object of the present invention to provide a concealed arming switch arrangement for a security system.

SUMMARY OF THE INVENTION

A switch is provided by a nonconductive ceramic magnet having a conductive foil on one side. A nonconductive tube has pair of electrical contacts comprised of two spaced galvanized steel wires, pins, rods, or similar elements extending across the inside diameter at one end. The magnet is positioned with its conductive surface facing the contact elements so as to complete a circuit when held to contact against the contact elements by the magnetic attraction of the switching magnet to the galvanized steel contact elements. This contact completes a security circuit included in a security system which protects the vehicle, residence, etc. with one or more theft deterrent devices, such as devices to disable a vehicle ignition, setting off an alarm when there are attempts to start the vehicle, a silent remote alarm, etc. The switch is mounted behind an interior trim panel in a motor vehicle for example, at a secret location.

The thin foil on one side of the magnet also can act as a fuse, melting if an excessive current flow occurs to open the circuit. This capability can eliminate the need for a relay.

A latching magnet carried by the operator is positioned against the secret location (known only to the operator), drawing the magnet off the contact elements and holding it against the opposite end of the tube. This holds open the security circuit to allow normal vehicle operation.

A bistable switch version allows setting the switch to a disabled condition by flipping a magnet to its opposite nonconductive side with the latching magnet. One side of the latching magnet is positioned to draw the switching magnet off the contact elements and to the opposite end of the tube. The latching magnet is then reversed, causing flipping of the switching magnet to its nonconductive side. Each side of the latching magnet is marked so as to indicate which side to position first to draw the switching magnet off the pins and then to position to flip the switching magnet.

Thus, the security switch remains "off" until again reset by the latching magnet. In this version, the tube must be large enough to accomodate the flipping of the switching magnet.

The switch can be installed in the door panel and the latching magnet clipped to clothing with a string or wire connection. When exiting the vehicle, the latching magnet is pulled off by the wire connection with the movement of the person to obtrusively activate the security circuit and disable the vehicle. A time delay feature can be incorporated to allow the car to be driven a short distance away before the security circuit is activated so as to protect the person from the hijacker.

The magnetic security switch can be used in many different applications, such as home security, etc.

The security system can include a delayed disablement of the vehicle, when activated. The brake lights can be activated at the same time the disablement occurs.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
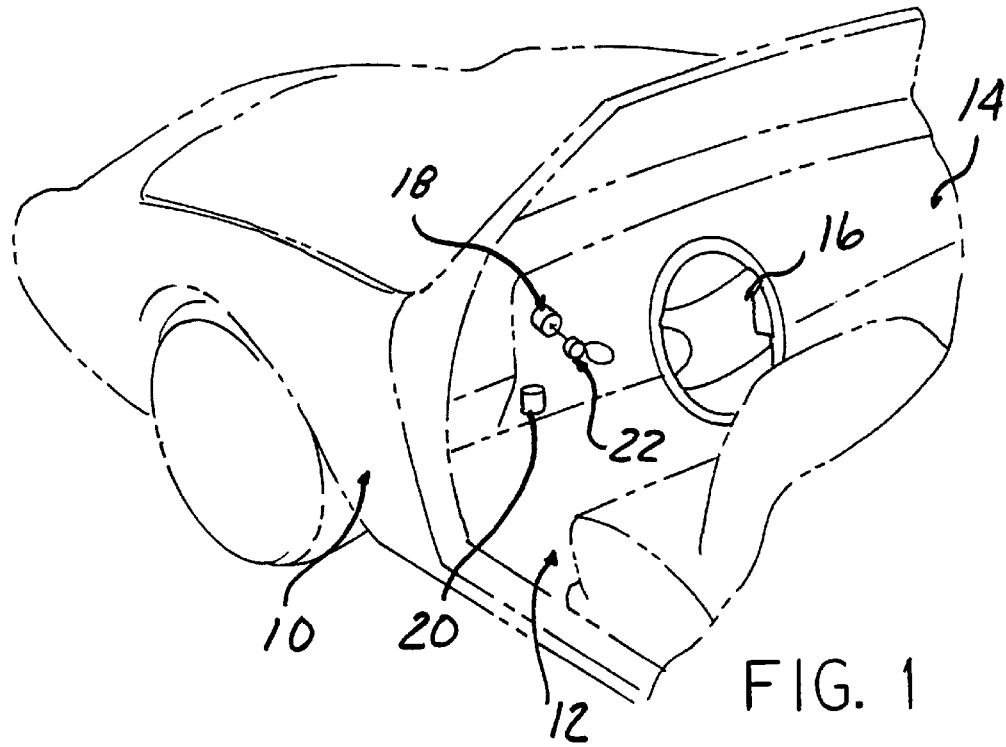
FIG. 1 is a perspective fragmentary view of a vehicle interior showing an installation of the arming switch arrangement according to the invention.

Referring to the drawings, FIG. 1 shows in phantom portions of an automobile 10, having an interior compartment 12 with an instrument panel 14 and steering wheel 16.

An arming switch 18 is mounted behind the instrument panel 14 at a concealed location for example to the left of the steering wheel.

A bistable "valet" switch 20 may also be provided. A latching magnet 22 used to disarm the switches 18 and 20 is shown in position over the arming switch 18.

Figure 2:
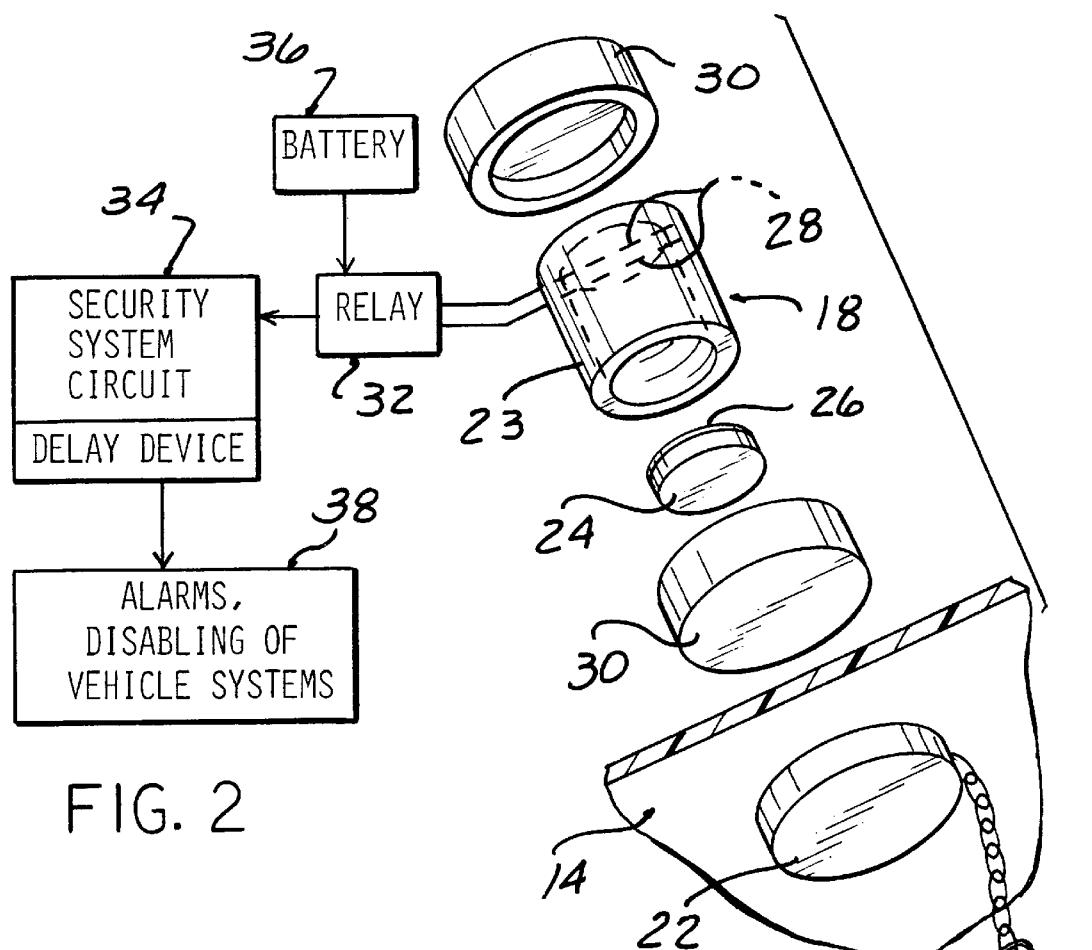
FIG. 2 a diagrammatic representation of the arrangement with an exploded perspective view of the switch components.

FIG. 2 shows further details of the arming switch 18, comprised of a nonconducting tube 23 in which a nonconductive ceramic switching disc magnet 24 is slidably fit. A thin conductive layer 26 of thin metal foil, is fixed on one side.

A pair of galvanized wire pins or rods 28 extend across an end to the tube 23, which has its ends closed off with caps 30. The thin foil layer 26 can act as a fuse, eliminating the need for a separate fuse and also a relay.

The switch 18 is mounted behind the instrument panel 14 at a concealed location known only to an authorized operator.

Figure 3:
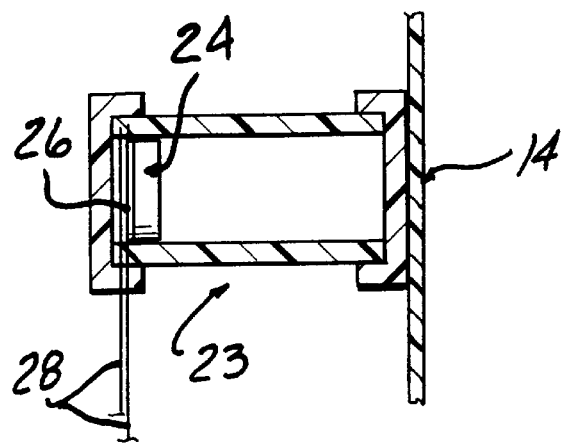
FIGS. 3 and 4 are partially sectional views of the switch and installation in armed and disarmed conditions.

The switching magnet 24 is normally attached to the rods 28 to complete a circuit to close a relay 32 allowing a security circuit 34 to be connected to the battery 36. (FIG. 3)

The security circuit operates various alarms and/or disabling devices for the vehicle systems 38.

Figure 4:
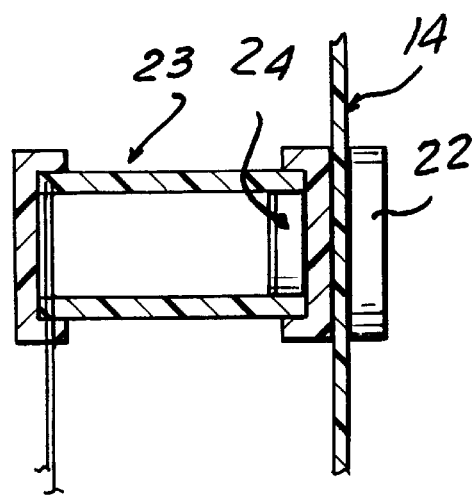

When the latching magnet 22 is placed over the switch 18, the switching magnet 24 is pulled off the rods 28 and holds the latching magnet 22 in position (which can be mounted on a keychain). (FIG. 4). This disarms the security system by turning off the security circuit 34.

Figure 5:
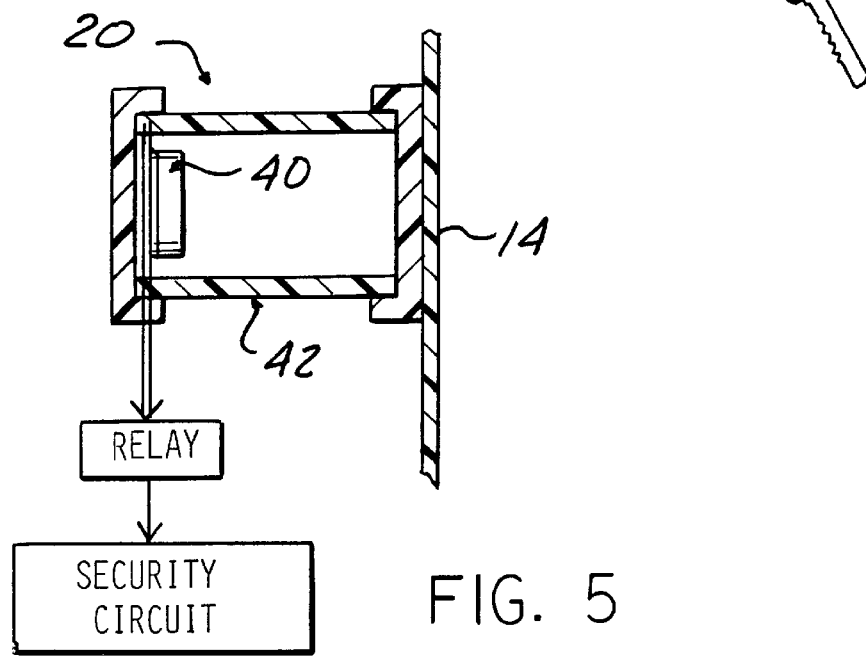
FIG. 5 is a sectional view of a bistable version of the switch, with a diagram of related components.
Figure 6:
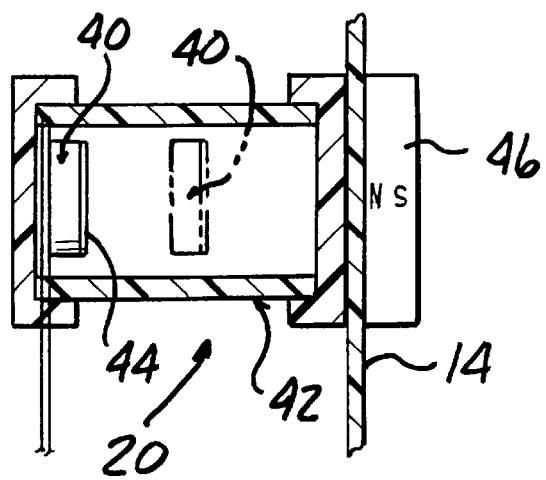
FIG. 6 a sectional view of the bistable switch of FIG. 5 being disarmed with a latching magnet.

FIGS. 5 and 6 show the bistable "valet" switch 20, which can be set to a normally armed or normally disarmed condition. This includes a smaller nonconductive switching magnet 40 capable of turning in the relatively larger tube 42 to be flipped to present either the face with a conductive foil layer 44 or the opposite nonconductive face.

A latching magnet 46 is momentarily applied to bring the switching magnet 40 next to the trim wall 14, and then reversed. The opposite polarity causes the switch magnet to reverse, presenting its nonconductive side. This disarms the security system until again reset. This allows the system to remain disarmed without the latching magnet.

Figure 7:
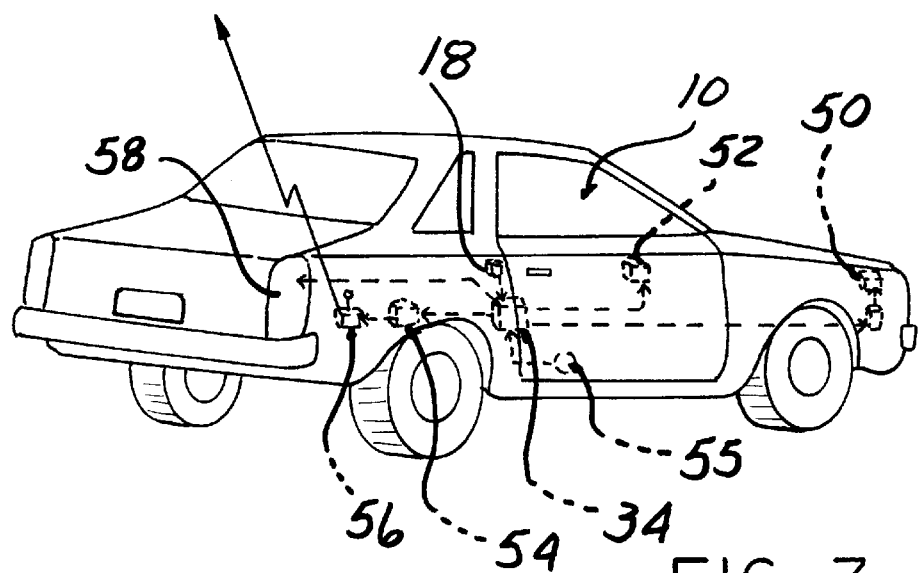
FIG. 7 is a perspective view of vehicle with diagrammatic representation of security system components.

FIG. 7 shows the vehicle 10 with an arming switch 18 activating the security circuit 34. A hood latch 50 and ignition kill 52 may be operated after a predetermined delay set by the circuit 34. An alarm 54 and housing transmitter 56 can also be activated. A motion or contact detector 55 may act to trigger the operation of the various deterent devices if the vehicle is touched, entered or moved, after a predetermined delay as mentioned above.

The brake lights 58 are also preferably turned on by the circuit 34 before or simultaneously when any disabling device is activated by the circuit 34.

Figure 8:
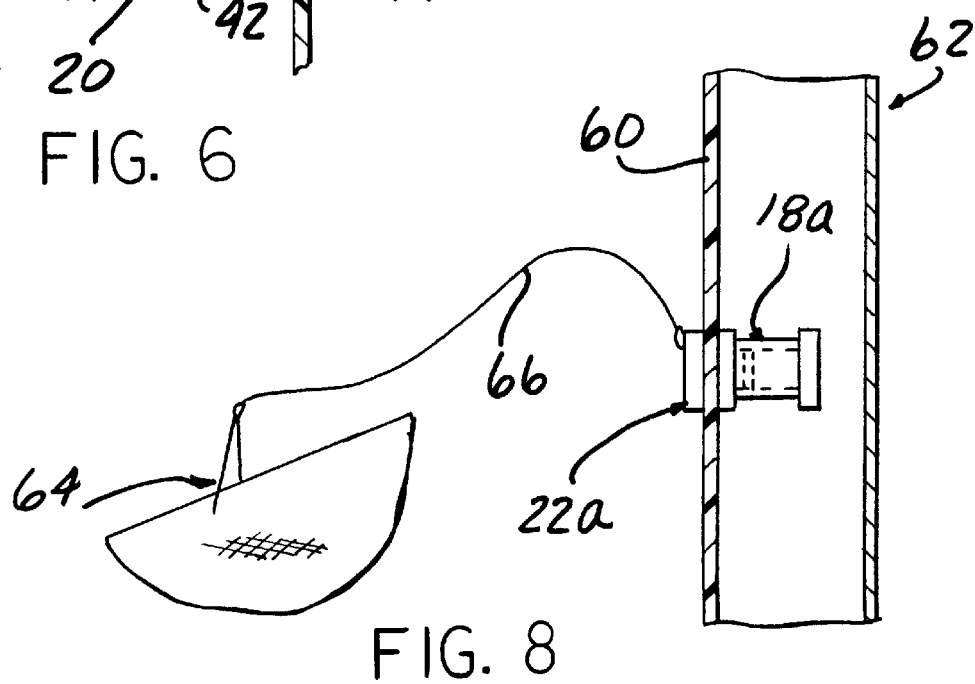
FIG. 8 shows a door mounted anti hijack application.

FIG. 8 shows a switch 18A installed behind a door trim panel of a door 62.

The latching magnet 22A has a clip 64 attached to a tether 66. The clip 64 is secured to the clothing of an operator. When leaving the vehicle at the demand of a highjacker, the latching magnet 22A is inobtrusively pulled off, arming the security system.

I claim:

1. A switching arrangement for arming and disarming a security system for a space having an exposed cover structure, comprising:

an arming switch mounted behind said covering structure for enabling operation of said security system, said arming switch including a tubular housing and a switching magnet in said housing movable to and from an arming location in said housing;

a pair of spaced conductors at said location which when electrically connected enable operations of said security system, means magnetically attracting said switching magnet to said position whereat said conductors are bridged and electrically connected by said magnet; and a latching magnet adapted to be positioned over said structure at the location of said arming switch to draw said switching magnet to said latching magnet and away from said conductor to disarm said security system.

2. The arrangement according to claim 1 wherein said switching magnet is nonconductive and has a conductive covering on one side contacting said conductors to complete a circuit and arm said security system.

3. The arrangement according to claim 2 wherein said switching magnet is fit in said housing to allow flipping sides, whereby a polarized latching magnet can flip said switching magnet to present a conductive or nonconductive side to said conductors, whereby a bistable operation is enabled.

4. The arrangement according to claim 1 wherein a clothing clip is attached to said latching magnet by a tether.

5. The arrangement according to claim 1 wherein said security system is associated with an automotive vehicle having brake lights and at least one theft deterrent device activated by said security system, and wherein said security system activates said brake lights whenever activating said theft deterrent device.

* * * * *